US005524216A

United States Patent [19]
Chan et al.

[11] Patent Number: 5,524,216
[45] Date of Patent: Jun. 4, 1996

[54] COHERENT TRANSACTION ORDERING IN MULTI-TIERED BUS SYSTEM

[75] Inventors: Kenneth K. Chan, San Jose; Thomas B. Alexander, Saratoga, both of Calif.; Robert E. Naas, Fort Collins, Colo.; Julie W. Wu, Cupertino, Calif.

[73] Assignee: Hewlett-Packard Company, Palo Alto, Calif.

[21] Appl. No.: 242,748

[22] Filed: May 13, 1994

[51] Int. Cl.⁶ .................................................. G06F 13/36
[52] U.S. Cl. ............................................. 395/287; 395/468
[58] Field of Search ...................................... 395/325, 725, 395/500, 425

[56] References Cited

U.S. PATENT DOCUMENTS

| | | | |
|---|---|---|---|
| 4,466,060 | 8/1984 | Riddle | 364/200 |
| 4,719,621 | 1/1988 | May . | |
| 5,050,066 | 9/1991 | Myers et al. | 364/200 |
| 5,142,672 | 8/1992 | Johnson et al. | 395/500 |
| 5,353,416 | 11/1994 | Olson | 395/725 |
| 5,363,485 | 7/1994 | Nguyen et al. | 395/725 |
| 5,367,689 | 11/1994 | Mayer et al. | 395/725 |
| 5,408,644 | 4/1995 | Schneider et al. | 395/425 |

FOREIGN PATENT DOCUMENTS

| | | | |
|---|---|---|---|
| 0319668 | 10/1988 | European Pat. Off. | G06F 13/36 |
| 2193356 | 2/1988 | United Kingdom | G06F 13/14 |

OTHER PUBLICATIONS

K. Chan, T. Alexander, C. Hu, D. Larson, N. Noordeen, Y. VanAtta, T. Wylegala, S. Ziai, Multiprocessor Features of the HP Corporate Business Servers, *IEEE Compcon Digest of Papers*, Feb. 1993, pp. 336–337.

Primary Examiner—Jack B. Harvey
Assistant Examiner—David A. Wiley

[57] ABSTRACT

A computer system has a multi-tiered bus system. The multi-tiered bus system includes one or more local buses and a central bus connected to each local bus by a bus interface. In order to maintain one global view of transaction ordering, the processors on each local bus record bus transactions in an order on which the bus transactions appear on the central bus. To do this, bus transactions which are initiated on any local bus are forwarded to the central bus by the corresponding bus interface. The processors connected to the local bus do not record bus transactions when they are initiated on the local bus. Every transaction which occurs on the central bus is echoed back to every local bus by the corresponding bus interface. Each processor records bus transactions at the time they are echoed back to the local bus.

15 Claims, 8 Drawing Sheets

COHERENT TRANSACTION ORDERING IN MULTI-TIERED BUS SYSTEM

BACKGROUND

The present invention concerns the coherent ordering of bus transactions in a multi-tiered bus.

Most modern computer systems include a central processing unit (CPU) and a main memory. In order to increase performance, the single CPU may be replaced, for example, by many processors with fast access to a high-bandwidth memory system. In one system, high multiprocessor performance is achieved by utilizing a tightly-coupled symmetrical multiprocessing reduced instruction set computer (RISC) processors placed on a high bandwidth coherent bus. See, for example, K. Chan, T. Alexander, C. Hu, D. Larson, N. Noordeen, Y. VanAtta, T. Wylegala, S. Ziai, Multiprocessor Features of the HP Corporate Business Servers, IEEE Compcon Digest of Papers, February 1993, pp. 336–337.

In the system described by the paper cited above, it is necessary for each processor to monitor transactions on the bus for the purpose of cache and translation look-aside buffer (TLB) coherency. When monitoring transactions, it is important for each processor to track the ordering of the transactions as well as the transactions themselves. This may be done, for example, by a transaction queue. Each processor monitors the bus. Whenever a transaction occurs on the bus, including transactions by the processor itself, the processor places the transaction in a queue. The transactions are then listed in the queue in the order in which the transactions occur on the bus.

While it is possible to use a queue to keep track of transactions for systems in which the system processors use a single processor memory bus, difficulties arise when it is necessary to track transaction order for a multi-tiered bus system. Particularly, in a multi-tiered bus system, generally some type of bus interface is used between each bus layer. Such a bus interface can add a significant amount of delay when transactions are relayed from one bus to another bus. In addition, it is desirable that each bus operates independently and simultaneously.

In such a case, all transactions on each bus can be echoed to all other busses. This will assure that each system processor will be able to observe each transaction performed on the computer system regardless of the bus to which it is connected. However, the order of transactions observed by a system processor will depend upon the particular bus to which the system processor is connected.

One way to assure that the observed transaction order is the same for all busses in the computer system is to suspend the ability of the computer system to simultaneously perform different transactions on different busses. That is, whenever a first transaction takes place on one bus, new transactions on other busses are suspended until the first transaction has propagated to the other busses. However, such suspension of bus activity can significantly impede performance of the computing system. It is desirable, therefore to implement a multi-tier bus in which each bus performs bus transactions simultaneous to the performance of bus transactions by other busses, and in which each system processor in the multi-tier bus system observes the same transaction order.

SUMMARY OF THE INVENTION

In accordance with the preferred embodiment of the present invention, a computer system with a multi-tiered bus system is presented. The multi-tiered bus system includes one or more local busses and a central bus, connected to each local bus by a bus interface. The processors on each local bus record bus transactions in an order on which the bus transactions appear on the central bus. The bus interface forwards to the central bus transactions which any of the plurality of processors initiates on the local bus. The bus interface forwards to the local bus, bus transactions which occur on the central bus. The bus transactions which occur on the central bus include bus transactions which are forwarded by the bus interface to the central bus. Each processor records bus transactions which are forwarded by the bus interface to the local bus. In the preferred embodiment, the processors record only bus transactions which are forwarded by the bus interface to the local bus. Also, in the preferred embodiment, the processors each record the bus transactions in a queue within the processor.

The preferred embodiment differs from the prior art, for example, in that processors do not record transactions when they first appear on their local bus, but wait to record them until the transaction is echoed back from the central bus by the bus interface. This provides for uniform recording of bus transactions for all processors connected together using a multi-tiered bus system. The order of transactions recorded by each processor (including each processor's own transactions) is the order the transactions appear on the central bus.

DESCRIPTION OF THE PREFERRED EMBODIMENT

Figure 1:
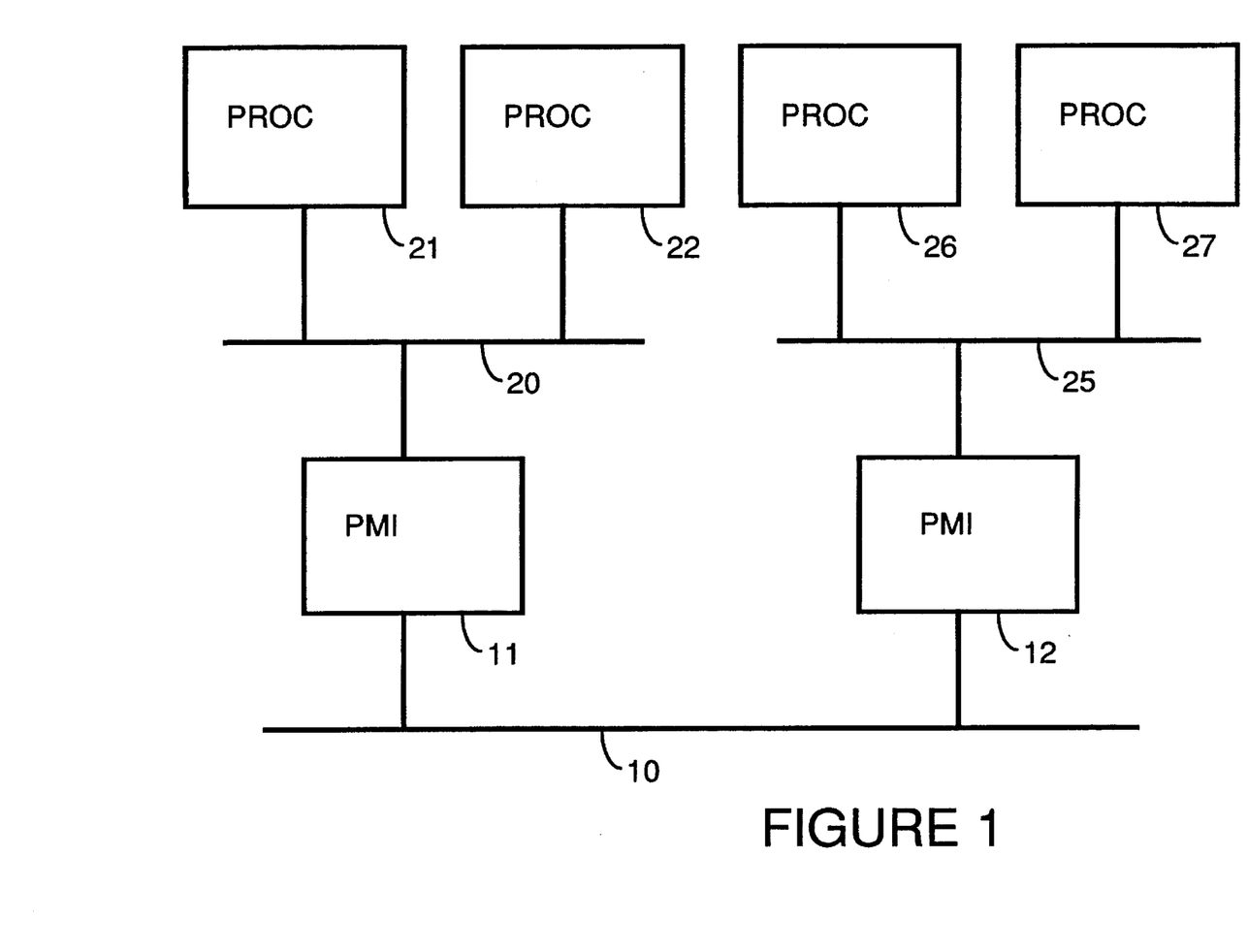
FIG. 1 shows a simplified block diagram of a multi-tiered system in accordance with a preferred embodiment of the present invention.

FIG. 1 shows a simplified block diagram of a multi-tiered bus system within a computing system in accordance with a preferred embodiment of the present invention. A processor memory interface (PMI) 11 and a processor memory interface 12 are connected to a central bus 10. Processor memory interface 11 interfaces central bus 10 to a local bus 20. Processor memory interface 12 interfaces central bus 10 to a local bus 25. A processor 21 and a processor 22 are connected to local bus 20. A processor 26 and a processor 27 are connected to local bus 25.

In the preferred embodiment of the present invention, processor 21, processor 22, processor 26 and processor 27 each monitors transactions on the multi-tiered bus system for the purpose of cache and translation look-aside buffer (TLB) coherency. This may be done, for example, using a queue. Each processor determines transaction order by the relative order of transactions placed on its queue. While the preferred embodiment utilizes a queue, it will be well understood in the art that a queue not be used as long as each processor has a means for determining the relative order of transactions within the multi-tiered bus system.

Figure 2:
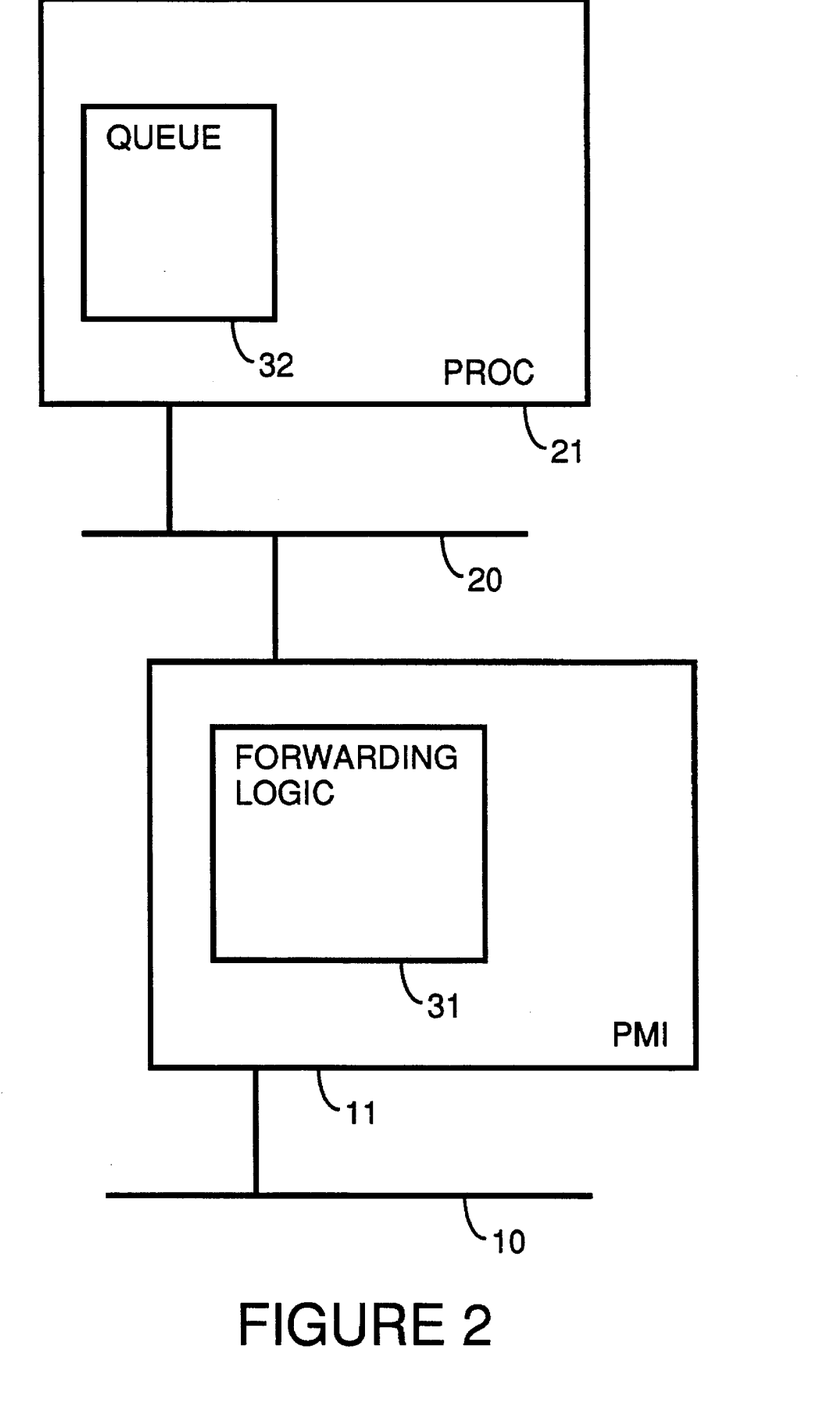
FIG. 2 shows a queue within a processor within the multi-tiered system shown in FIG. 1, in accordance with the preferred embodiment of the present invention.

FIG. 2 shows a queue 32 within processor 21. In the preferred embodiment, processor 21 determines transaction order by the relative order of transactions placed on queue 32. Within processor memory interface 11, forwarding logic 31 forwards transactions between central bus 10 and local bus 25.

In the preferred embodiment, in order to assure that the transaction order is uniform across the multi-tiered system, transaction order for the multi-tiered system is determined to be the transaction order on central bus 10. Forwarding logic 31, therefore, forwards all bus transactions performed on local bus 20 to central bus 10. Likewise, forwarding logic 31, forwards all bus transactions performed on central bus 10 to local bus 20.

Figure 3:
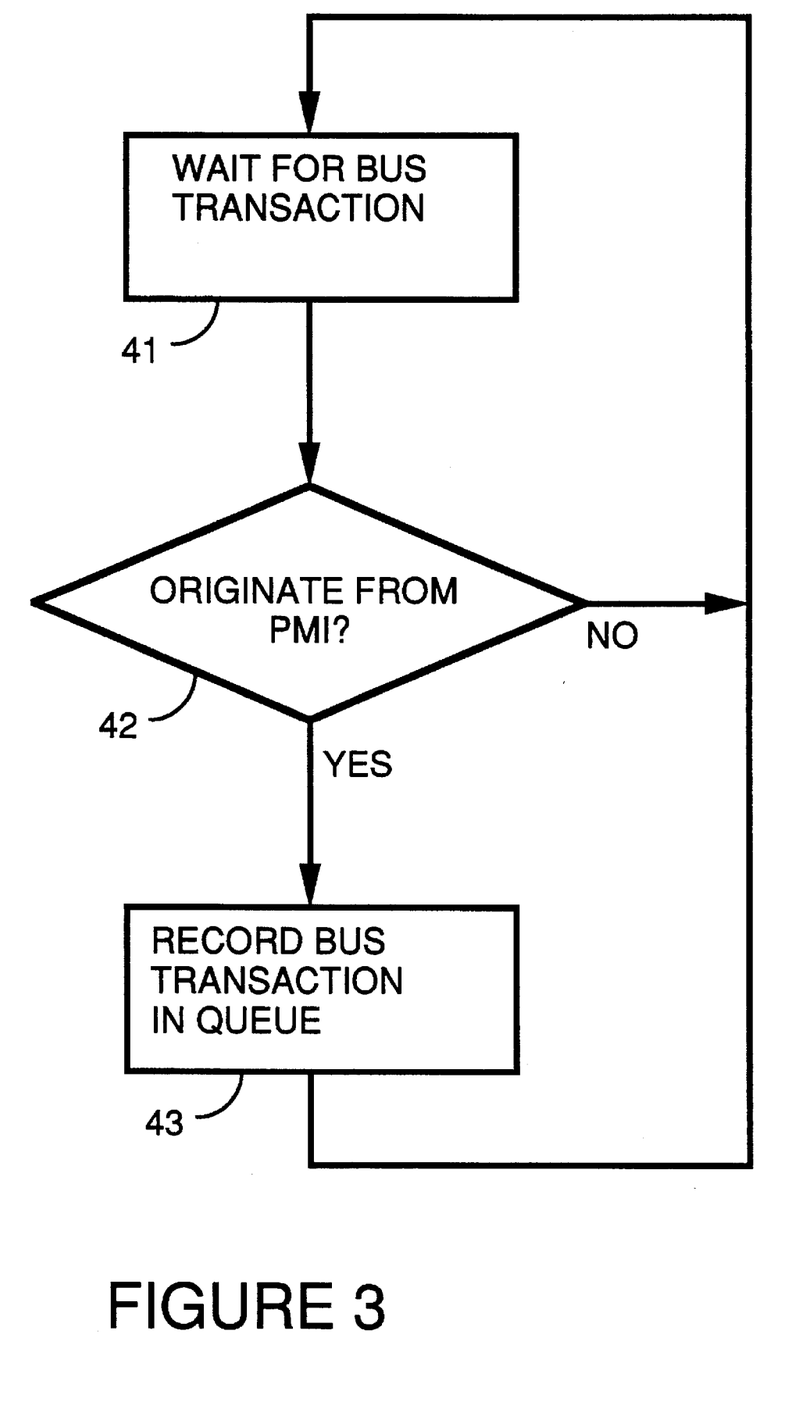
FIG. 3 is a processor's flowchart which describes a method for plating bus transactions on a queue, in accordance with a preferred embodiment of the present invention.

FIG. 3 is a flowchart which describes a method for placing bus transactions on queue 32, in accordance with a preferred embodiment of the present invention. In a step 41, the processor monitors transactions on the local bus. The monitored transactions on the local bus include transactions originated by all processors on the local bus including the processor performing the monitoring as well as the processor memory interface. When a transaction is detected, in a step 42, a determination is made as to whether the transaction originated from a processor memory interface. If the bus transaction originates from a processor memory interface, the transaction is recorded on the queue in a step 43. If the bus transaction does not originate from a processor memory interface, the bus transaction is not recorded on the queue. The processor then resumes monitoring transactions on the local bus waiting for the next transaction on the local bus.

Figure 4:
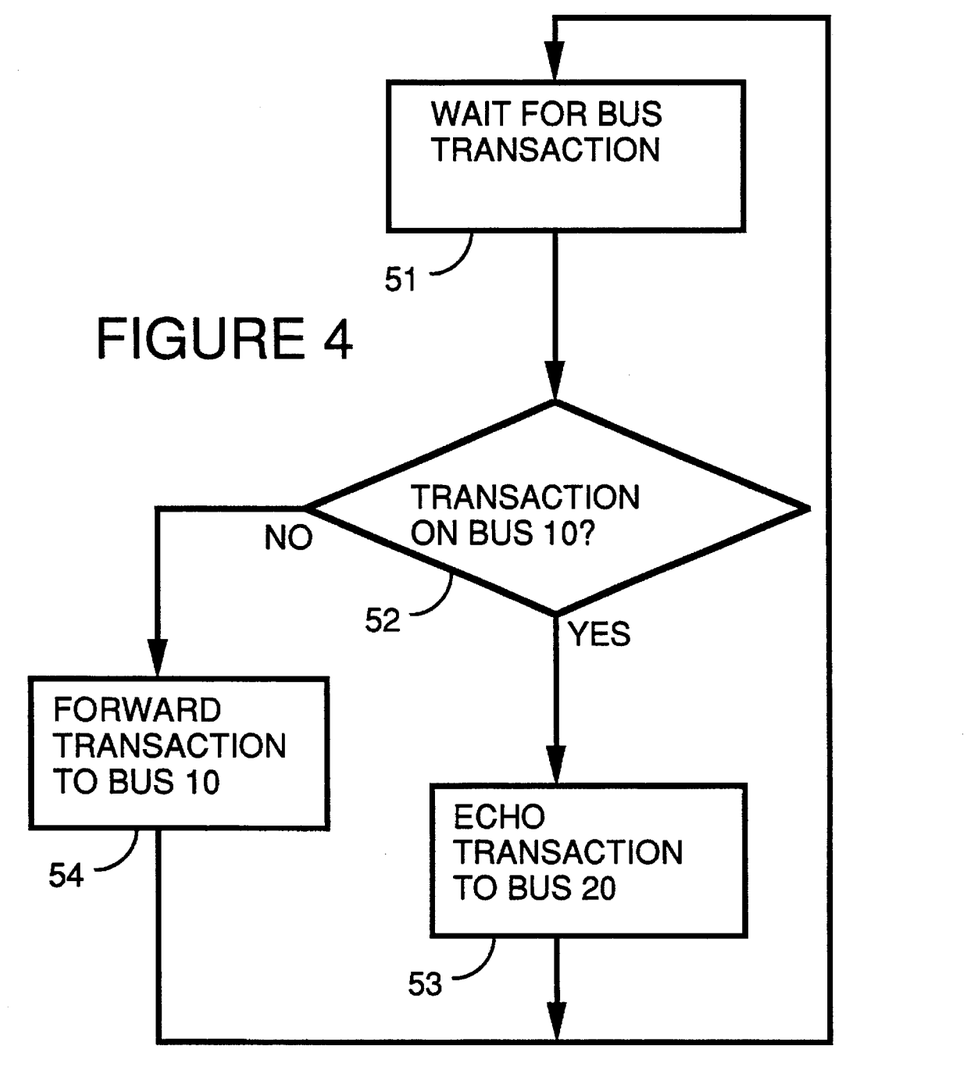
FIG. 4 is a processor memory interface's (PMI) flowchart which describes a method for forwarding bus transactions between busses, in accordance with a preferred embodiment of the present invention.

FIG. 4 is a flowchart which describes a method by which a processor memory interface transfers bus transactions between central bus 10 and a local bus, in accordance with a preferred embodiment of the present invention. In a step 51, the processor memory interface monitors transactions on both central bus 10 and the local bus. The monitored transactions on the local bus include transactions originated by all processors on the local bus. Transactions originating from the processor memory interface on the local bus are not monitored. The monitored transactions on central bus 10 include transactions originated by all processors and processor memory interfaces connected to central bus 10, including the processor memory interface performing the monitoring. When a transaction is detected, in a step 52, a determination is made as to whether the transaction is on central bus 10. If the transaction is on central bus 10, in step 53, the transaction is forwarded to the local bus. If the bus transaction is not on central bus 10, i.e., it is on the local bus, the bus transaction is forwarded to central bus 10. The processor memory interface then resumes monitoring transactions on bus 10 and on the local bus waiting for the next transaction. The transactions forwarded from local bus 20 to central bus 10 are echoed back to local bus 20 by PMI 11. However, the transactions forwarded from central bus 10 to local bus 20 are not echoed back to central bus 10.

Figure 5:
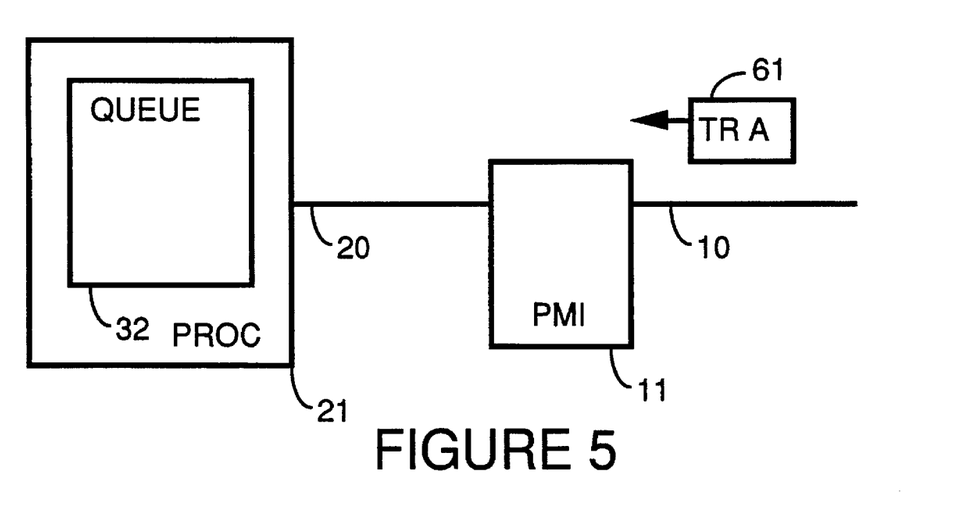
FIG. 5, FIG. 6, FIG. 7, FIG. 8, FIG. 9, FIG. 10 and FIG. 11 illustrate a method for placing bus transactions on a queue in accordance with the preferred embodiment of the present invention.
Figure 6:
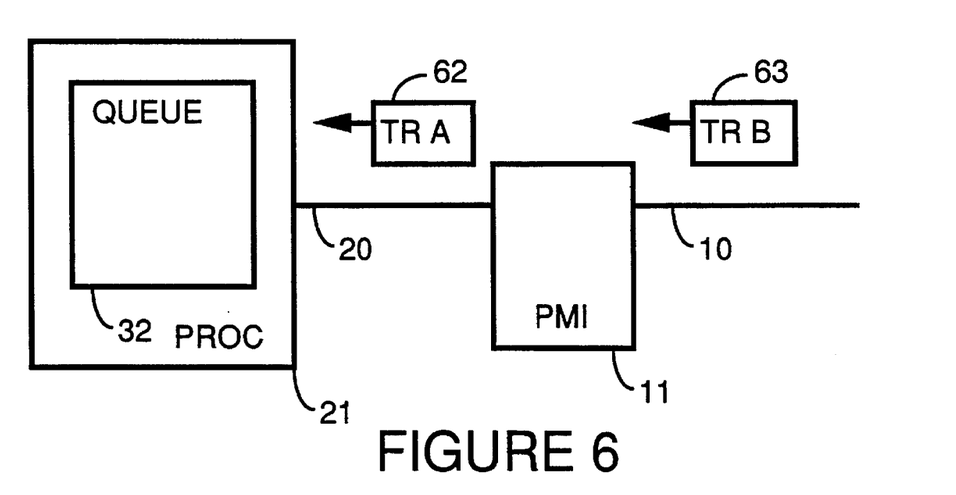

Operation of a multi-tiered bus in accordance with the preferred embodiment is illustrated by observing how processor 21 adds transactions to queue 32. For example, in FIG. 5, at a time one, a transaction A, represented by a message 61, is placed on central bus 10. In FIG. 6, at a time two, processor memory interface 11 has, in accordance with the flowchart shown in FIG. 4, forwarded transaction A on to local bus 20, as represented by a message 62. Also at time two, a transaction B, represented by a message 63, is placed on central bus 10.

Figure 7:
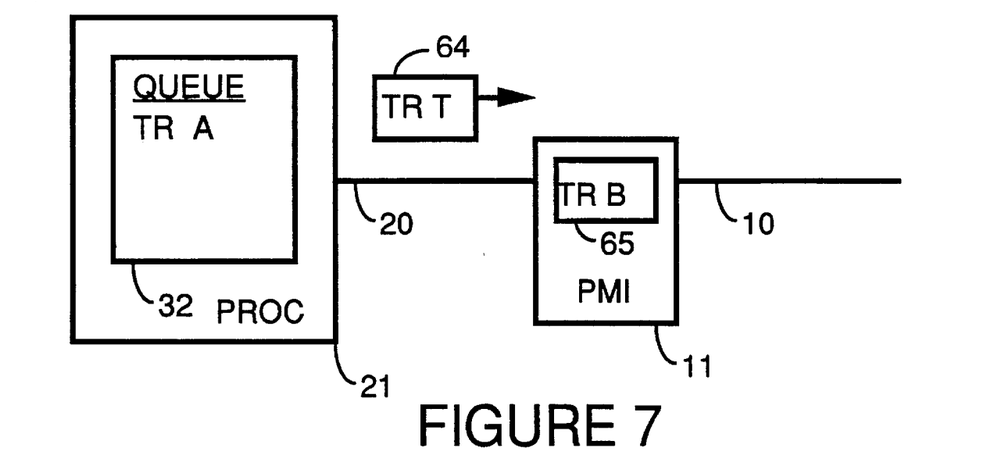

In FIG. 7, at a time three, in accordance with the flowchart shown in FIG. 3, processor 21 has recorded transaction A in queue 32. Processor 21 also has originated a transaction T on local bus 20, as represented by a message 64. In accordance with the flowchart shown in FIG. 3, processor 21 has not recorded transaction T in queue 32 because transaction T was not originated by a processor memory interface. At time three, processor memory interface 11 is storing transaction 65, as represented by a message 65, waiting for an opportunity to access local bus 20.

Figure 8:
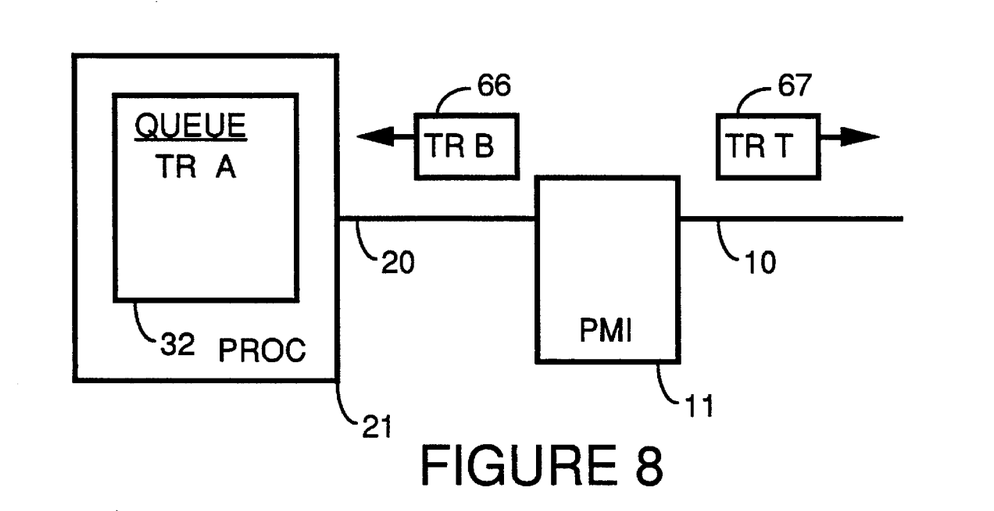

In FIG. 8, at a time four, in accordance with the flowchart shown in FIG. 4, processor memory interface 11 has forwarded transaction B on to local bus 20, as represented by a message 66. Also at time four, in accordance with the flowchart shown in FIG. 4, processor memory interface 11 has forwarded transaction T on to central bus 10, as represented by a message 67.

Figure 9:
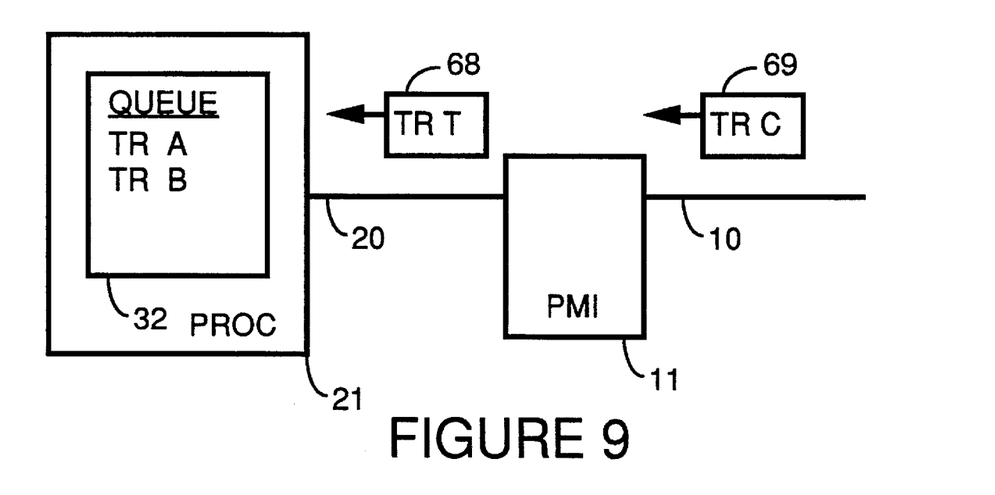

In FIG. 9, at a time five, in accordance with the flowchart shown in FIG. 3, processor 21 has recorded transaction B in queue 32. Also at time five, processor memory interface 11 has, in accordance with the flowchart shown in FIG. 4, echoed transaction T on to local bus 20, as represented by a message 68. Also at time five, a transaction C, represented by a message 69, is placed on central bus 10.

Figure 10:
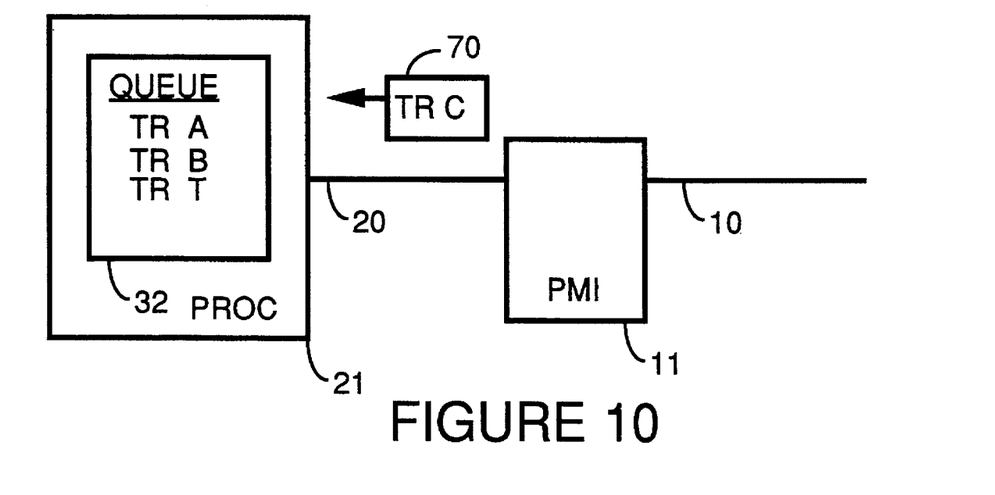

In FIG. 10, at a time six, in accordance with the flowchart shown in FIG. 3, processor 21 has recorded transaction T in queue 32. Also at time six, processor memory interface 11 has, in accordance with the flowchart shown in FIG. 4, forwarded transaction C on to local bus 20, as represented by a message 70. It is important to note that transaction T is not recorded in queue 32 until after transaction T has been echoed back by processor memory interface 11.

Figure 11:
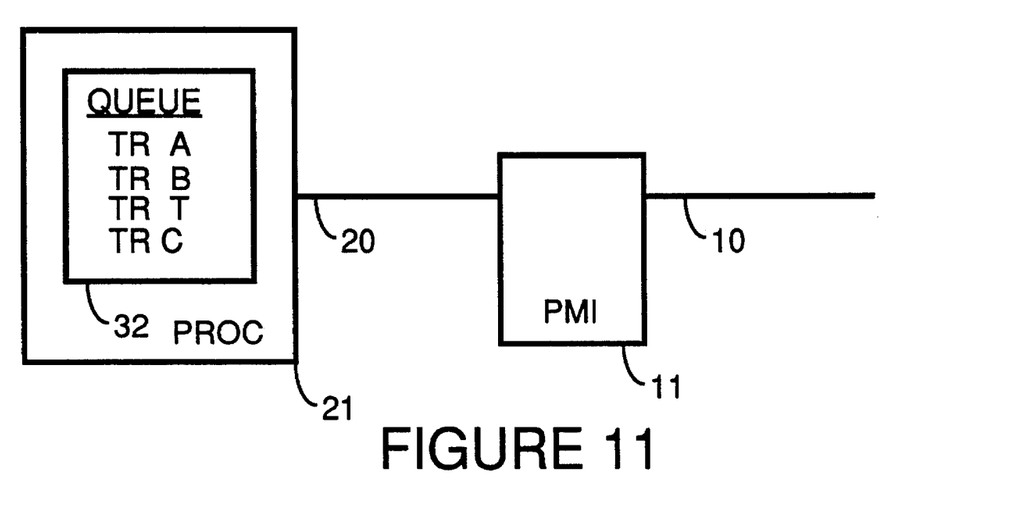

In FIG. 11, at a time seven, in accordance with the flowchart shown in FIG. 3, processor 21 has recorded transaction C in queue 32. The resulting values in queue 32 reflect the order which transactions appeared on central bus 10 and not the order transactions appeared on local bus 20.

The foregoing discussion discloses and describes merely exemplary methods and embodiments of the present invention. As will be understood by those familiar with the art, the invention may be embodied in other specific forms without departing from the spirit of essential characteristics thereof. Accordingly, the disclosure of the present invention is intended to be illustrative, but not limiting, of the scope of the invention, which is set forth in the following claims.

We claim:

1. In a computing system with a local bus and a central bus connected by a bus interface, a method by which a processor on the local bus records bus transactions in an order on which the bus transactions appeared on the central bus, the method comprising the steps of:

(a) forwarding, by the bus interface to the central bus, bus transactions which the processor initiated on the local bus;

(b) forwarding, by the bus interface to the local bus, bus transactions which occurred on the central bus, the bus transactions which occurred on the central bus including bus transactions which were forwarded by the bus interface to the central bus in step (a); and, (c) recording, by the processor, bus transactions which were forwarded by the bus interface to the local bus in step (b), the bus transactions thereby being recorded in the order on which the bus transactions appeared on the central bus.

2. A method as in claim 1 wherein in step (c) the bus transactions recorded by the processor are recorded in a queue.

3. A method as in claim 1 wherein in step (c) only bus transactions which are forwarded by the bus interface to the local bus in step (b) are recorded by the processor.

4. A method as in claim 1 wherein the local bus and the central bus are part of a multi-tiered bus system.

5. In a computing system with a local bus and a central bus connected by a bus interface, a method by which a plurality of processors on the local bus record bus transactions in an order on which the bus transactions appeared on the central bus, the method comprising the steps of:

(a) forwarding, by the bus interface to the central bus, bus transactions which any of the plurality of processors initiated on the local bus;

(b) forwarding, by the bus interface to the local bus, bus transactions which occurred on the central bus, the bus transactions which occurred on the central bus including bus transactions which were forwarded by the bus interface to the central bus in step (a); and, (c) recording, by each of the plurality of processors, bus transactions which were forwarded by the bus interface to the local bus in step (b), the bus transactions thereby being recorded by each processor in the order on which the bus transactions appeared on the central bus.

6. A method as in claim 5 wherein in step (c) only bus transactions which are forwarded by the bus interface to the local bus in step (b) are recorded by each of the plurality of processors.

7. A method as in claim 5 wherein in step (c) for each of the plurality of processors, the bus transactions recorded by the processor are recorded in a queue within the processor.

8. A method as in claim 5 wherein the local bus and the central bus are part of a multi-tiered bus system.

9. A computing system comprising:

a local bus;

a central bus;

a processor coupled to the local bus; and, a bus interface, coupled to the local bus and to the central bus, the bus interface including:

first forwarding means, coupled to the local bus and the central bus, for forwarding to the central bus, bus transactions which the processor initiated on the local bus, and second forwarding means, coupled to the local bus and the central bus, for forwarding to the local bus, bus transactions which occurred on the central bus, the bus transactions which occurred on the central bus including bus transactions which were forwarded by the first forwarding means to the central bus;

wherein the processor includes recording means for recording bus transactions which were forwarded by the second forwarding means to the local bus, thereby recording the bus transactions in the order on which the bus transactions appear on the central bus.

10. A computing system as in claim 9 wherein the processor additionally includes a queue, the recording means recording the bus transactions in the queue.

11. A computing system as in claim 9 additionally comprising a second processor, coupled to the local bus, the second processor including second recording means for recording bus transactions which are forwarded by the second forwarding means to the local bus.

12. A computing system as in claim 11 wherein the second processor additionally includes a second queue, the second recording means recording the bus transactions in the second queue.

13. A computing system as in claim 11 wherein the recording means and the second recording means record only bus transactions which are forwarded by the second forwarding means to the local bus.

14. A computing system as in claim 9 wherein the recording means records only bus transactions which are forwarded by the second forwarding means to the local bus.

15. A computing system as in claim 9 wherein the local bus and the central bus are part of a multi-tiered bus system.

* * * * *